US007929147B1

(12) United States Patent
Fong et al.

(10) Patent No.: US 7,929,147 B1
(45) Date of Patent: Apr. 19, 2011

(54) METHOD AND SYSTEM FOR DETERMINING AN OPTIMIZED ARTIFICIAL IMPEDANCE SURFACE

(75) Inventors: Bryan H. Fong, Los Angeles, CA (US); Joseph S. Colburn, Malibu, CA (US); John Ottusch, Malibu, CA (US); Daniel F. Sievenpiper, Los Angeles, CA (US); John L. Visher, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 500 days.

(21) Appl. No.: 12/156,445

(22) Filed: May 31, 2008

(51) Int. Cl.
*G01B 11/02* (2006.01)
*H01Q 15/02* (2006.01)
*H01Q 15/24* (2006.01)

(52) U.S. Cl. ........................................ 356/496; 343/909

(58) Field of Classification Search .................. 356/496, 356/511; 343/909
See application file for complete search history.

(56) References Cited

U.S. PATENT DOCUMENTS 5,917,458 A 6/1999 Ho et al.
6,208,316 B1 3/2001 Cahill
6,411,261 B1 * 6/2002 Lilly ............................ 343/756
6,483,481 B1 11/2002 Sievenpiper et al.
6,512,494 B1 * 1/2003 Diaz et al. .................... 343/909
6,518,931 B1 2/2003 Sievenpiper et al.
6,670,932 B1 * 12/2003 Diaz et al. .................... 343/909
7,190,315 B2 * 3/2007 Waltho .......................... 343/705
7,218,281 B2 * 5/2007 Sievenpiper et al. .. 343/700 MS
7,256,753 B2 * 8/2007 Werner et al. ................ 343/909
7,732,127 B2 * 6/2010 Wang et al. ........................ 435/4
7,830,310 B1 * 11/2010 Sievenpiper et al. .. 343/700 MS
2002/0167457 A1 * 11/2002 McKinzie et al. ............ 343/909
2003/0011522 A1 * 1/2003 McKinzie et al. ..... 343/700 MS
2003/0112186 A1 * 6/2003 Sanchez et al. ........ 343/700 MS
2003/0122729 A1 * 7/2003 Diaz et al. ..................... 343/909
2003/0142036 A1 * 7/2003 Wilhelm et al. .............. 343/909
2003/0231142 A1 * 12/2003 McKinzie et al. ............ 343/909
2004/0140945 A1 * 7/2004 Werner et al. ................. 343/909
2005/0017919 A1 * 1/2005 Sievenpiper et al. ......... 343/909
2005/0134521 A1 * 6/2005 Waltho ........................... 343/909
2005/0134522 A1 * 6/2005 Waltho ........................... 343/909
2006/0152430 A1 * 7/2006 Seddon et al. ................ 343/909
2007/0001909 A1 * 1/2007 Sievenpiper et al. .. 343/700 MS
2007/0285316 A1 * 12/2007 Saily et al. ............. 343/700 MS (Continued)

OTHER PUBLICATIONS

Checcacci, V., et al., "Holographic antennas," IEEE Transactions on Antennas and Propagation, vol. 18, No. 6, pp. 811-813, Nov. 1970.

(Continued)

*Primary Examiner* — Patrick J Connolly
(74) *Attorney, Agent, or Firm* — Tope-McKay & Assoc.

(57) ABSTRACT

A method and system for determining an optimized artificial impedance surface is disclosed. An artificial impedance pattern is calculated on an impedance surface using an optical holographic technique given an assumed surface wave profile and a desired far field radiation pattern. Then, an actual surface wave profile produced on the impedance surface from the artificial impedance pattern, and an actual far field radiation pattern produced by the actual surface wave profile are calculated. An optimized artificial impedance pattern is then calculated by iteratively re-calculating the artificial impedance pattern from the actual surface wave profile and the desired far field radiation pattern. An artificial impedance surface is determined by mapping the optimized artificial impedance pattern onto a representation of a physical surface.

11 Claims, 6 Drawing Sheets

U.S. PATENT DOCUMENTS

| | | | | |
|---|---|---|---|---|
| 2009/0015499 | A1 * | 1/2009 | Kuroda | 343/787 |
| 2009/0201220 | A1 * | 8/2009 | Kim et al. | 343/907 |

OTHER PUBLICATIONS

Fathy, A. E., et al., "Silicon-Based reconfigurable antennas—concepts, analysis, implementation and feasibility," IEEE Transactions on Microwave Theory and Techniques, vol. 51, No. 6, pp. 1650-1661, Jun. 2003.

King, R., et al., "The synthesis of surface reactance using an artificial dielectric," IEEE Transactions on Antennas and Propagation, vol. 31, No. 3, pp. 471-476, May 1993.

Levis, K., et al., "Ka-Band dipole holographic antennas," IEEE Proceedings of Microwaves, Antennas and Propagation, vol. 148, No. 2, pp. 129-132, Apr. 2001.

Mitra, R., et al., Techniques for Analyzing Frequency Selective Surfaces—A Review, Proceedings of the IEEE, vol. 76, No. 12, pp. 1593-1615, Dec. 1988.

Oliner, A., et al., "Guided waves on sinusoidally-modulated reactance surfaces," IEEE Transactions on Antennas and Propagation, vol. 7, No. 5, pp. 201-208, Dec. 1959.

Pease, R., "Radiation from modulated surface wave structures II," IRE International Convention Record, vol. 5, pp. 161-165, Mar. 1957.

Sazonov, D.M., "Computer aided design of holographic antennas and propagation," IEEE International Symposium of the Antennas and the Propagation Society 1999, vol. 2, pp. 738-741, Jul. 1999.

Sievenpiper, D., et al., "High-Impedance electromagnetic surfaces with a forbidden frequency band," IEEE Transactions on Microwave Theory and Techniques, vol. 47, No. 11, pp. 2059-1074, Nov. 1999.

Thomas, A., et al., "Radiation from modulated surface wave structures I," IRE International Convention Record, vol. 5, pp. 153-160, Mar. 1957.

* cited by examiner

METHOD AND SYSTEM FOR DETERMINING AN OPTIMIZED ARTIFICIAL IMPEDANCE SURFACE

BACKGROUND OF THE INVENTION (1) Field of Invention

The present invention relates to a method for determining an artificial impedance surface and, in particular, to a method for determining an optimized artificial impedance surface by calculating actual surface wave profiles supported on the impedance surface.

(2) Description of Related Art

The closest related art for the creation of artificial impedance surfaces is disclosed in U.S. Pat. No. 7,218,281 to Sievenpiper et al., herein incorporated by reference (hereinafter "Sievenpiper et al."). Sievenpiper et al. discloses how to create an artificial impedance surface using metal patterning in order to scatter a given excitation into a desired far field radiation pattern. This method of creating the surface patterning relies on a radiofrequency holographic technique, where the impedance pattern is determined from the interference of a surface wave and the desired outgoing wave. Sievenpiper et al. uses only assumed surface wave profiles when determining the impedance pattern. However, due to the effects of edge scattering from the edges of the surface, the details of the feed excitation, and the local variation in surface wave wavenumber due to the local variation in the artificial impedance value, the actual surface wave profiles produced on the impedance surface are different than the assumed surface wave profile. Using only an assumed surface wave profile therefore results in less than optimal efficiency of conversion from excitation input power to the desired far field radiation pattern.

Thus, a continuing need exists for a method of creating an optimized impedance pattern based on the actual currents supported on the impedance surface.

SUMMARY OF INVENTION

The present invention relates to a method for determining an artificial impedance surface and, in particular, to a method for determining an optimized artificial impedance surface by calculating actual surface wave profiles supported on the impedance surface.

The method begins with user selection of a set of input parameters, the set of input parameters comprising an impedance range, a feed excitation surface wave, and an impedance surface.

From the set of input parameters, a $0^{th}$ order surface wave profile is calculated for the impedance surface.

The user then determines a desired far field radiation pattern to be achieved.

From the $0^{th}$ order surface wave profile and the desired far field radiation pattern, an artificial impedance pattern is calculated for the impedance surface. A non-limiting example of a method suitable for performing this calculation is the optical holographic technique described in U.S. Pat. No. 7,218,281 to Sievenpiper et al., incorporated herein by reference in its entirety.

From the calculated artificial impedance pattern, an actual surface wave profile produced on the impedance surface by the artificial impedance pattern, and an actual far field radiation pattern produced by the actual surface wave profile are calculated. Calculating the actual surface wave profile produced requires use of an electromagnetic simulation tool capable of taking into account the effects of edge scattering from a surface with a varying impedance boundary condition and generally arbitrary surface geometry. A simulator and calculation method capable performing the required calculations is described in U.S. Pat. No. 6,847,925 to Ottusch et al., incorporated herein by reference in its entirety.

Because the actual surface wave profile produced on the impedance surface will be distorted by the effects of factors such as edge scattering, the details of the feed excitation wave, and the local variation in artificial surface impedance, the actual far field radiation pattern produced will be different than the desired far field radiation pattern. Therefore the next step in the method is to calculate an optimized artificial impedance pattern that will yield the desired far field radiation pattern. This step is performed by iteratively recalculating the artificial impedance pattern from the actual surface wave profile and the desired far field radiation pattern until a predetermined termination criterion is met.

Finally, an optimized artificial impedance surface is determined by mapping the optimized artificial impedance pattern onto a representation of a physical surface. This artificial impedance surface map indicates the patterning necessary to create an actual physical impedance surface.

In another embodiment of the present invention, wherein in the act of selecting a set of input parameters, the impedance range is selected from a set of physically realizable maximum and minimum impedances.

In yet another embodiment, wherein in the act of calculating an optimized artificial impedance pattern, the optimized artificial impedance pattern is calculated through use of a Picard-like iteration scheme, the Picard-like iteration scheme taking the form:

$$Z^{(n+1)}(x)=-if(Re(E_{out}\cdot J_{surf}^{*(n)}/|J_{surf}^{(n)}|));$$

where:

- $Z^{(n+1)}(x)$ is the $(n+1)^{th}$ iteration of the impedance pattern as a function of position x on the surface;
- i is the imaginary number Sqrt[−1];
- f(s) is a function that rescales its argument so that $s_{min}$ and $s_{max}$ correspond to the minimum and maximum realizable impedances;
- Re(s) gives the Real part of s;
- $E_{out}(x)$ is the desired electric field vector of the outgoing radiation pattern evaluated at the position x on the surface;
- A·B is the dot product of vectors A and B;
- $J^{(n)}_{surf}(x)$ is the $n^{th}$ iteration of the surface wave vector evaluated at position x on the surface;
- J* represents the complex conjugate of the function J; and
- |A| is the norm of the vector A.

In another embodiment of the invention, wherein in the act of calculating an optimized artificial impedance pattern, the optimized artificial impedance pattern is calculated through use of a Picard-like iteration scheme, the Picard-like iteration scheme taking the form:

$$Z^{(n+1)}(x)=-if(Re[\psi_{out}\psi_{surf}^{*(n)}/\psi_{surf}^{(n)}|[)$$

where:

- $Z^{(n+1)}(x)$ is the $(n+1)^{th}$ iteration of the impedance pattern as a function of position x on the surface;
- i is the imaginary number Sqrt[−1];
- f(s) is a function that rescales its argument so that $s_{min}$ and $s_{max}$ correspond to the minimum and maximum realizable impedances;
- Re(s) gives the Real part of s;
- $\psi_{out}(x)$ is the desired field scalar of the outgoing radiation pattern evaluated at the position x on the surface;
- $\psi^{(n)}_{surf}(x)$ is the $n^{th}$ iteration of the surface wave scalar evaluated at position x on the surface;

$\psi^*$ represents the complex conjugate of the function $\psi$; and $|\psi|$ is the modulus of the scalar $\psi$.

In a further embodiment, wherein in the act of calculating an optimized artificial impedance pattern, the iteration scheme is terminated by a criterion selected from a group consisting of the end of a fixed time period, when the actual far field radiation pattern calculated is substantially improved from the actual far field radiation pattern calculated from the $0^{th}$ order surface wave profile, and when the actual far field radiation pattern substantially converges to the desired far field radiation pattern.

In yet another embodiment, the method of the present invention further comprises an act of forming a physical impedance surface based on the artificial impedance surface map.

In another embodiment, the present invention also comprises the artificial surface map produced by the method described herein.

In another embodiment, the present invention further comprises the physical impedance surface formed by the method described herein.

As can be appreciated by one skilled in the art, the present invention also comprises a data processing system having memory and a processor, the data processing system including computer-readable instructions for causing the data processing system to perform the acts of the above-mentioned method.

Finally, as can be appreciated by one skilled in the art, the present invention further comprises a computer program product having computer readable instructions encoded thereon for causing a data processing system to perform the acts of the above-mentioned method.

BRIEF DESCRIPTION OF THE DRAWINGS

The objects, features, and advantages of the present invention will be apparent from the following detailed descriptions of the various aspects of the invention in conjunction with reference to the following drawings, where.

DETAILED DESCRIPTION

Figure 1:
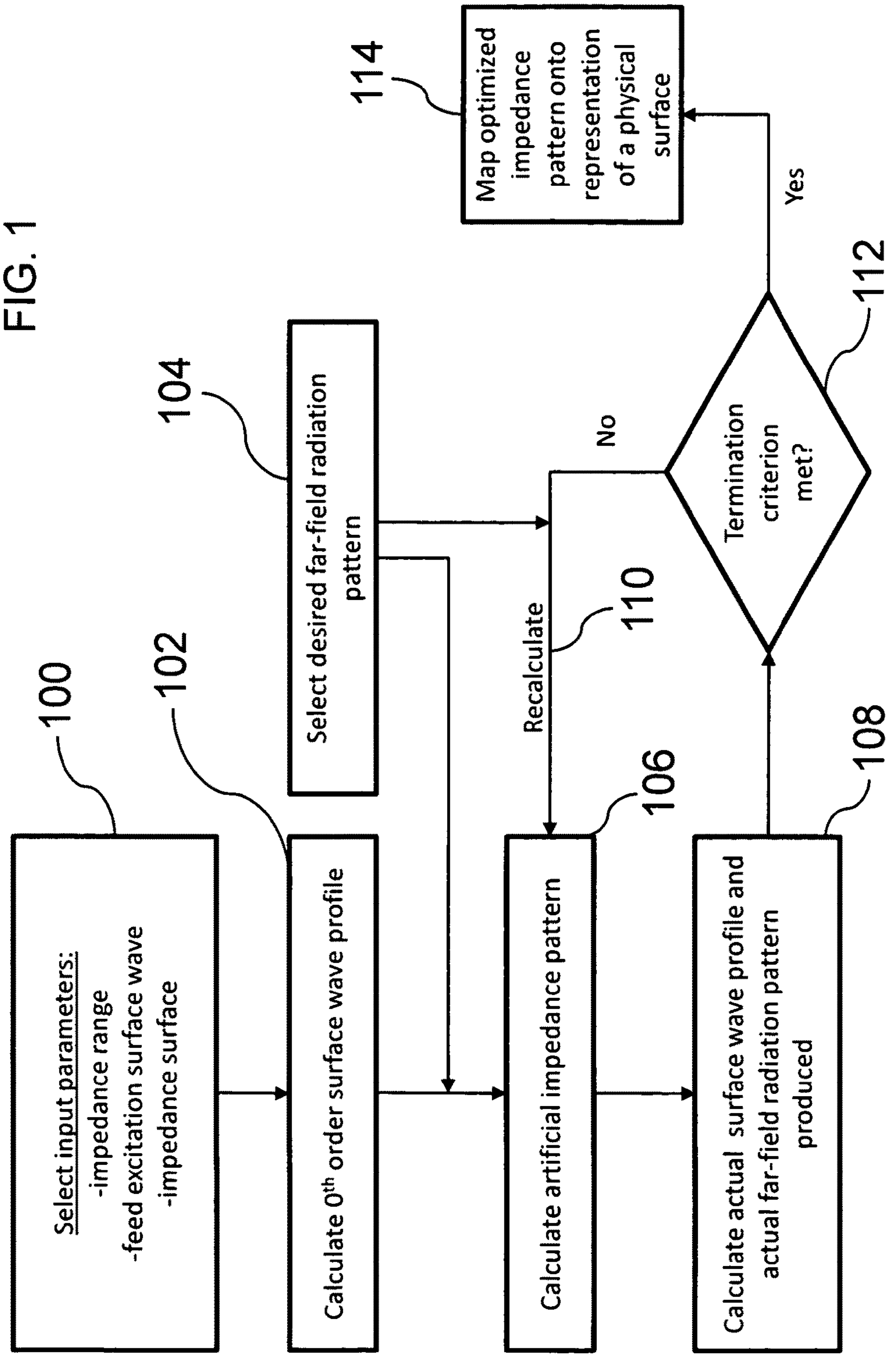
FIG. 1 is a flow diagram of the overall method of the present invention.

The present invention relates to a method for determining an artificial impedance surface, and in particular a method for determining an optimized artificial impedance surface by calculating actual surface wave profiles supported on the impedance surface. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

The present invention relates to a method for determining an artificial impedance surface and, in particular, a method for determining an optimized artificial impedance surface by calculating actual surface wave profiles supported on the impedance surface.

An artificial impedance surface can be created by metal patterning on a dielectric surface above a ground plane. By varying the local size and spacing of the metal patterning, specific reactive impedance values can be obtained. To scatter a given excitation from the artificial impedance surface into a desired far field pattern, one can use a holographic technique to determine the required space-dependent impedance pattern and, in turn, the local metal patterning necessary to create the desired impedance function. The details of the metal patterning and basic holographic technique are described fully in Sievenpiper et al., herein incorporated by reference.

An artificial impedance pattern using the optical holographic technique is created by the interference of an object and reference wave. In the case of an artificial impedance surface, the basic holographic technique discussed in Sievenpiper et al. takes the object wave to be the surface wave generated by a feed excitation wave and the reference wave to be the outgoing wave that generates the desired far field radiation pattern. For example, for a surface wave $\psi_{surf}(x)$ generated by a point source on an impedance surface in the x-y plane and a desired outgoing plane wave $\psi_{out}(x)$ with wavenumber k, the interference pattern is given by:

$$\psi_{int}(x)=Re[\psi_{out}\psi_{surf}^*]=Re[exp(ik\cdot x)exp(-i\kappa\sqrt{(x-x_s)^2+(y-y_s)^2})],$$

where:

x is the position on the surface;

$\psi_{int}(x)$ is the interference pattern scalar at position x on the surface;

$\psi_{out}(x)$ is the desired field scalar of the outgoing radiation pattern evaluated at the position x on the surface;

$\psi_{surf}(x)$ is the surface wave scalar evaluated at position x on the surface;

$\psi^*$ represents the complex conjugate of the function $\psi$;

Re(s) gives the Real part of s;

i is the imaginary number Sqrt[−1];

A·B is the dot product of vectors A and B;

$\kappa=k\sqrt{1+X^2}$ is the bound surface wave wavevector;

x is the position on the x-axis;

$x_s$ is the point source position on the x-axis;

y is the position on the y-axis;

$y_s$ is the point source position on the y-axis; and

X is the normalized surface impedance.

In the above example the interference is determined by scalar waves; the surface wave is assumed to be generated by a point surface on the surface; the surface wave wavevector is fixed and depends on a single impedance value X; the interference varies between −1 and +1. To guide a transverse magnetic surface wave, the actual impedance function on the surface is given by:

$$Z(x)=-i[X+M\psi_{int}(x)],$$

where:

Z(x) is the value of the impedance pattern as a function of position x on the surface;

i is the imaginary number Sqrt[−1];

M is the size of the impedance modulation; and

X is the impedance value.

The above example uses the time harmonic convention exp(−iωt). The impedance function varies between −i(X−M) and −(X+M); these minimum and maximum impedance values are constrained by what is physically realizable using the metal patterning technique mentioned above.

This basic method of specifying the impedance pattern can be improved and generalized by taking into account the vector nature of the currents and outgoing wave, and the details of the surface wave. The present invention specifies how to include these generalizations and to build improved artificial impedance surfaces based on optimized surface impedance patterns.

Generating an optimized impedance pattern based on the actual currents supported on an impedance surface requires the use of an electromagnetic simulation tool that is capable of modeling spatially varying impedance boundary conditions and computing the surface waves produced on the impedance surface. A method and program for performing the required simulations is partially described in U.S. Pat. No. 6,847,925 to Ottusch et al., herein incorporated by reference. The Ottusch patent describes scattering from a perfect electrical conductor (PEC), but does not describe impedance boundary condition scattering. A reference which discloses the necessary equations to incorporate impedance boundary scattering is Glisson, A. W. (1992), Electromagnetic scattering by arbitrarily shaped surfaces with impedance boundary conditions, Radio Sci., 27(6), 935-943.

FIG. 1 is a flow diagram of the overall method of the present invention. The first step in the method is for a user to select a set of input parameters 100, the input parameters comprising an impedance range, a feed excitation surface wave, and an impedance surface. Such parameters will be recognized by one skilled in the art as necessary variables to be defined in order to execute the method of the present invention. To achieve a useful result, the impedance range is selected from a set of physically realizable maximum and minimum impedances determined by the physical properties of a desired physical impedance surface. The feed excitation surface wave can take any form, nonlimiting examples being a point source feed, a monopole feed, and a parallel plate waveguide feed. The impedance surface can take any shape, nonlimiting examples being a flat plate shape, a cylindrical shape, and an irregular shape.

From the selected set of input parameters 100, a $0^{th}$ order surface wave profile is calculated for the impedance surface 102. For example, for a point source feed excitation on a flat impedance surface, the assumed vectorial surface wave profile is given by:

$$J_{surf}(x)=\hat{r}exp(i\kappa r)/\sqrt{r},$$

where:

$J_{surf}(x)$ is the surface current vector evaluated at position x on the surface;

$\hat{r}$ is the surface radial vector emanating from the point source location $x_s$;

$r=\sqrt{(x-x_s)^2+(y-y_s)^2}$; and $\kappa=k\sqrt{1+X^2}$ is the bound surface wave wavevector.

Note that the $0^{th}$ order surface wave profile is an assumed surface wave profile and does not necessarily represent the actual surface wave profile generated on the surface. Also note that the functional form in the above equation requires that the impedance surface be planar.

The next step in the method is to determine a desired far field radiation pattern to be achieved 104. For example, for an outgoing electromagnetic plane wave with wavevector k, the far field radiation pattern is given by:

$$E_{out}(x)=E_0exp(ik\cdot x),$$

where:

$E_{out}(x)$ is the desired electric field vector of the outgoing radiation pattern evaluated at the position x on the surface;

$E_0$ is a constant vector giving the polarization of the outgoing wave; and

A·B is the dot product of vectors A and B.

To calculate the artificial impedance pattern 106 on the surface, one takes the inner product of the surface wave profile and far field radiation vectors in the following fashion:

$$Z(x)=-i[X+MRe(E_{out}\cdot J_{surf}^*/|J_{surf}|)]$$

where:

Z(x) is the value of the impedance pattern as a function of position x on the surface;

i is the imaginary number Sqrt[−1];

X is the impedance value;

M is the size of the impedance modulation;

Re(s) gives the Real part of s;

$E_{out}(x)$ is the desired electric field vector of the outgoing radiation pattern evaluated at the position x on the surface;

$J_{surf}(x)$ is the surface wave vector evaluated at position x on the surface;

A·B is the dot product of vectors A and B;

J* represents the complex conjugate of the function J; and

|A| is the norm of the vector A.

This initial calculated surface impedance pattern takes into account the vector nature of the electric field and the surface wave profile currents, but still is limited to an assumed functional form for the surface wave profile vector. Because of the inner product and current normalization, this form for the impedance pattern no longer has maximum and minimum values between −i(X+M) and −i(X−M). The user must now incorporate the selected impedance range M (modulation), selected appropriately to match the physically realizable maximum and minimum impedances.

In the next step of the method, to obtain a more realistic form for the surface wave profile vector, one must, in general, numerically compute the actual surface wave profile produced on the impedance surface 108. Given a feed excitation and impedance pattern on the surface, Maxwell's equations can be solved numerically to obtain the actual surface wave profile on the surface. Note here that the surface wave profile depends on the impedance pattern on the surface, which, if the impedance pattern is generated by the holographic technique described above, in turn depends on the surface wave profile.

To calculate an optimized artificial impedance pattern that is consistent with the surface wave profile that generates the desired far field pattern, the present method iteratively recalculates 110 the artificial impedance pattern from the actual surface wave profile 108 and the desired far field radiation pattern desired 104. The iterative process can be performed using the following Picard-like iteration scheme:

$$Z^{(n+1)}(x)=-if(Re(E_{out}\cdot J_{surf}^{*(n)}/|J_{surf}^{(n)}|)),$$

where:

- $Z^{(n+1)}(x)$ is the $(n+1)^{th}$ iteration of the impedance pattern as a function of position x on the surface;
- i is the imaginary number Sqrt[−1];
- f(s) is a function that rescales its argument so that $s_{min}$ and $s_{max}$ correspond to the minimum and maximum realizable impedances;
- Re(s) gives the Real part of s;
- $E_{out}(x)$ is the desired electric field vector of the outgoing radiation pattern evaluated at the position x on the surface;
- A·B is the dot product of vectors A and B;
- $J^{(n)}_{surf}(x)$ is the $n^{th}$ iteration of the surface wave vector evaluated at position x on the surface;
- J* represents the complex conjugate of the function J; and
- |A| is the norm of the vector A.

The equation above applies to electromagnetic radiation, but the present invention has potential application to any waveform phenomenon, nonlimiting examples being sound waves (SONAR) and seismic waves. The holographic artificial surface impedance technique is applicable to vector electromagnetic waves as well as scalar waves such as sound waves (SONAR). In both cases, a surface wave can be bound to a surface by introducing a layer of material whose bulk wave propagation velocity is slower than the ambient medium wave propagation velocity. Holographic patterning of the surface is physically implemented by locally varying the layer bulk propagation velocity. Because the basic holographic impedance technique is applicable to both scalar and vector waves, the optimization method described herein also applies to both scalar and vector waves. For application to sound waves, the above equation is modified so that all vectors are now scalars, yielding:

$$Z^{(n+1)}(x)=-if(Re[\psi_{out}\psi_{surf}^{*(n)}/|\psi_{surf}^{(n)}|])$$

where:

- $Z^{(n+1)}(x)$ is the $(n+1)^{th}$ iteration of the impedance pattern as a function of position x on the surface;
- i is the imaginary number Sqrt[−1];
- Re(s) gives the Real part of s;

- f(s) is a function that rescales its argument so that $s_{min}$ and $s_{max}$ correspond to the minimum and maximum realizable impedances;
- $\psi_{out}(x)$ is the desired field scalar of the outgoing radiation pattern evaluated at the position x on the surface;
- $\psi^{(n)}_{surf}(x)$ is the $n^{th}$ iteration of the surface wave scalar evaluated at position x on the surface;
- ψ* represents the complex conjugate of the function ψ; and
- |ψ| is the modulus of the scalar ψ.

The iteration scheme is terminated when a termination criterion is met 112. Non-limiting examples of termination criteria are members selected from the group consisting of the end of a fixed time period, when the actual far field radiation pattern calculated 108 is substantially improved from the actual far field radiation pattern calculated from the $0^{th}$ order surface wave profile 102, and when the actual far field radiation pattern 110 substantially converges to the desired far field radiation pattern 104.

After termination of the iterative scheme, the optimized artificial impedance pattern data is mapped onto the representation of a physical impedance surface 114. This artificial impedance surface map can then be used to guide the creation of a physical impedance surface.

Figure 2:
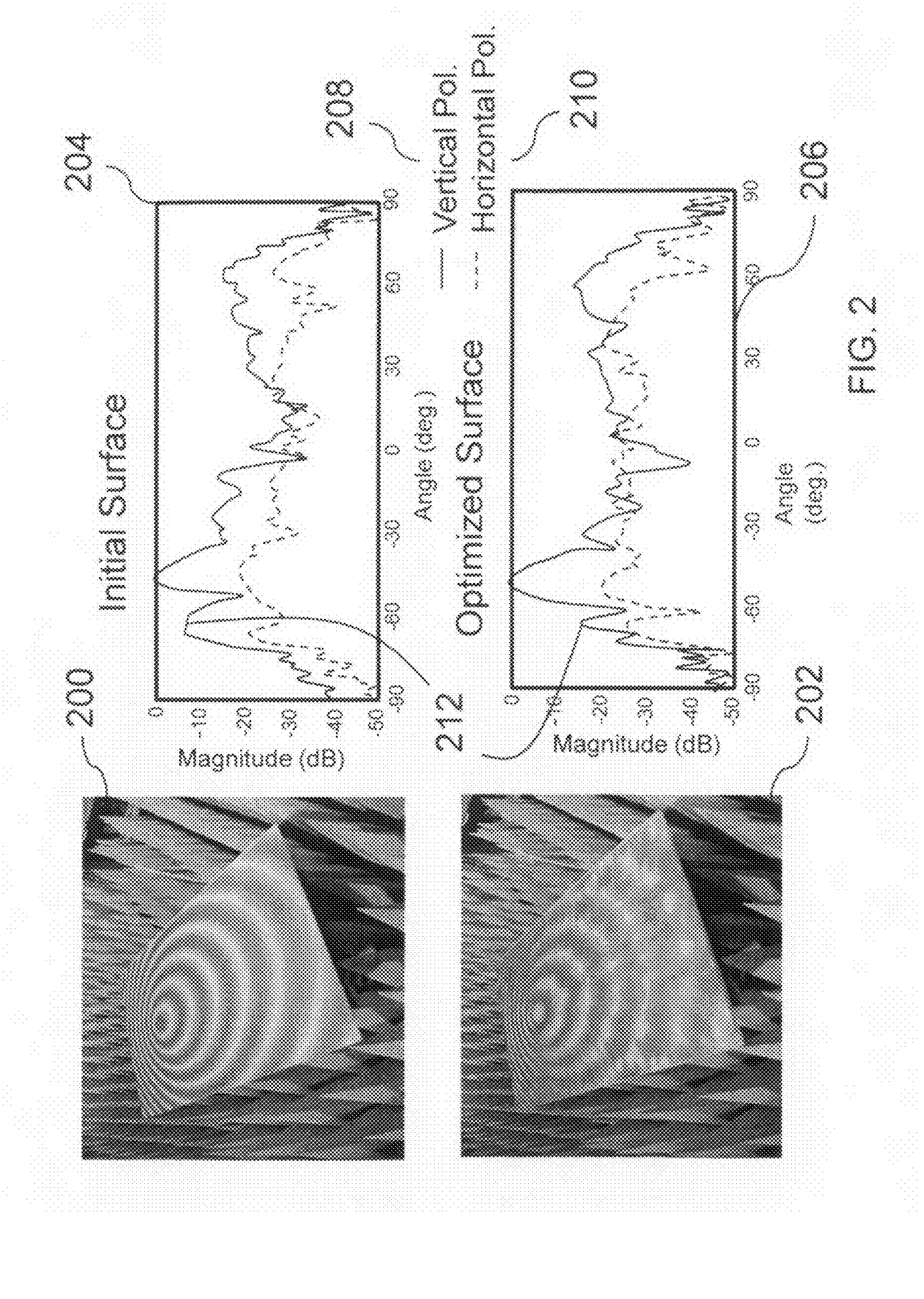
FIG. 2 is a set of illustrations and graphs providing a comparison view of an initial and optimized impedance patterns on a flat plate surface, and their respective far field radiation patterns.

FIG. 2 is set of illustrations and graphs showing a comparison view of an initial impedance pattern 200 and optimized impedance pattern 202 on a flat plate surface, and their respective initial 204 and optimal 206 far field radiation patterns. The vertical polarization lines 208 represent the magnitude of the exiting beam taken as a function of the angle measured vertically/lengthwise across the surface. The horizontal polarization lines 210 represent the magnitude of the exiting beam taken as a function of the angle measured horizontally/widthwise across the surface. By taking into account direct reflections of the feed from the surface, edge reflections, and local surface wave wavenumber variations, the optimized impedance pattern 202 shows a 10 dB reduction in side lobe radiation 212 for vertical/co-polarization. The surfaces shown were designed to radiate from a monopole feed into a pencil beam at 45 degrees from normal.

Figure 3:
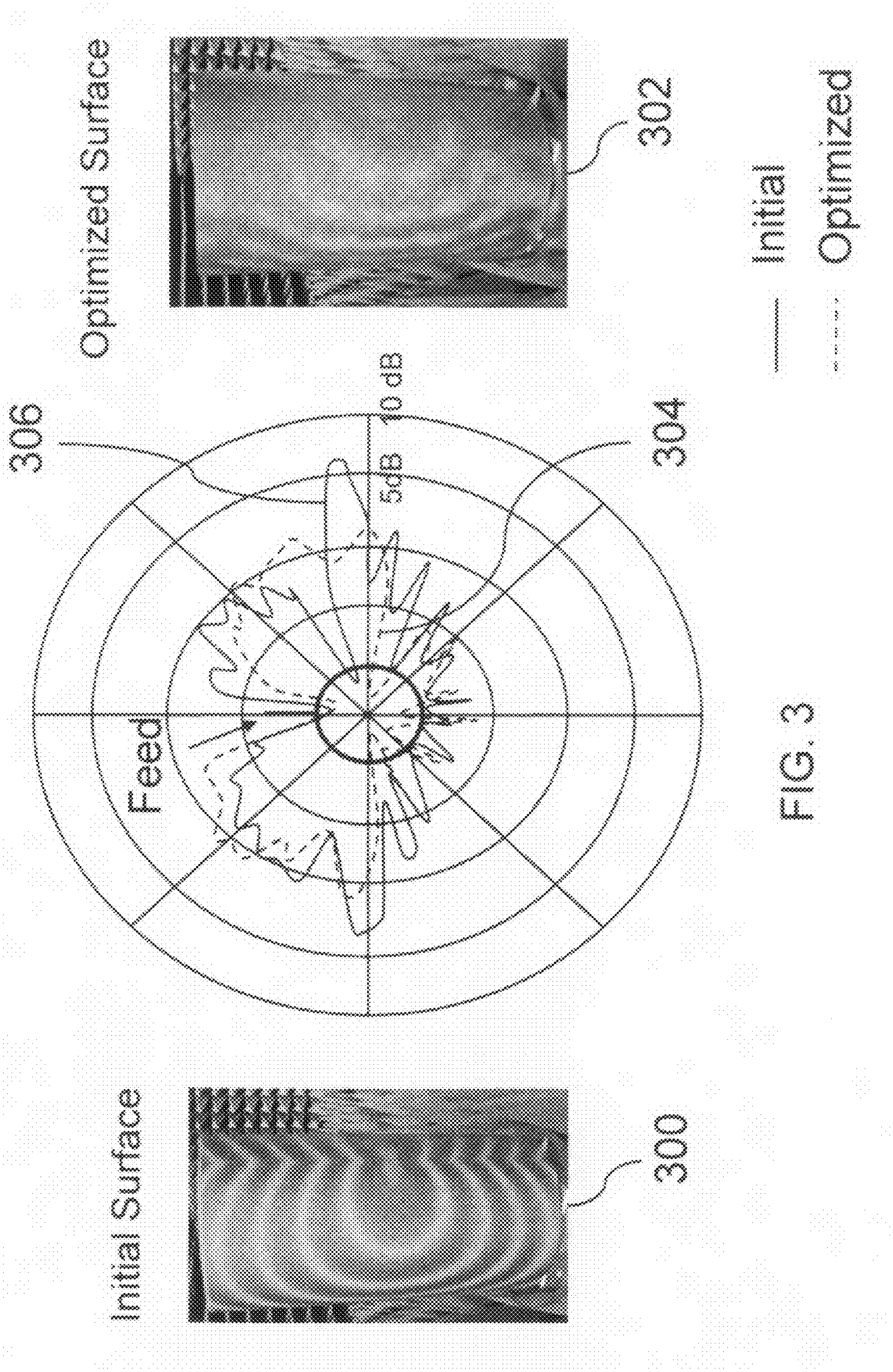
FIG. 3 is a set of illustrations and a polar plot showing initial and optimized impedance patterns for a cylindrical surface, and their respective far field radiation patterns.

FIG. 3 is a set of illustrations and a polar plot showing an initial impedance pattern 300 and optimized impedance pattern 302 on a cylindrical surface, and their respective initial 304 and optimal 306 far field radiation patterns. As can be seen from the far field data, the initial scalar hologram pattern modifies the far field pattern of the plain metallic cylinder, creating small beams at 0 and 180 degrees for which it was designed, using a monopole feed excitation. The optimized cylindrical hologram surface increases the gain of the 0 and 180 degree beams by about 5 dB.

Figure 4:
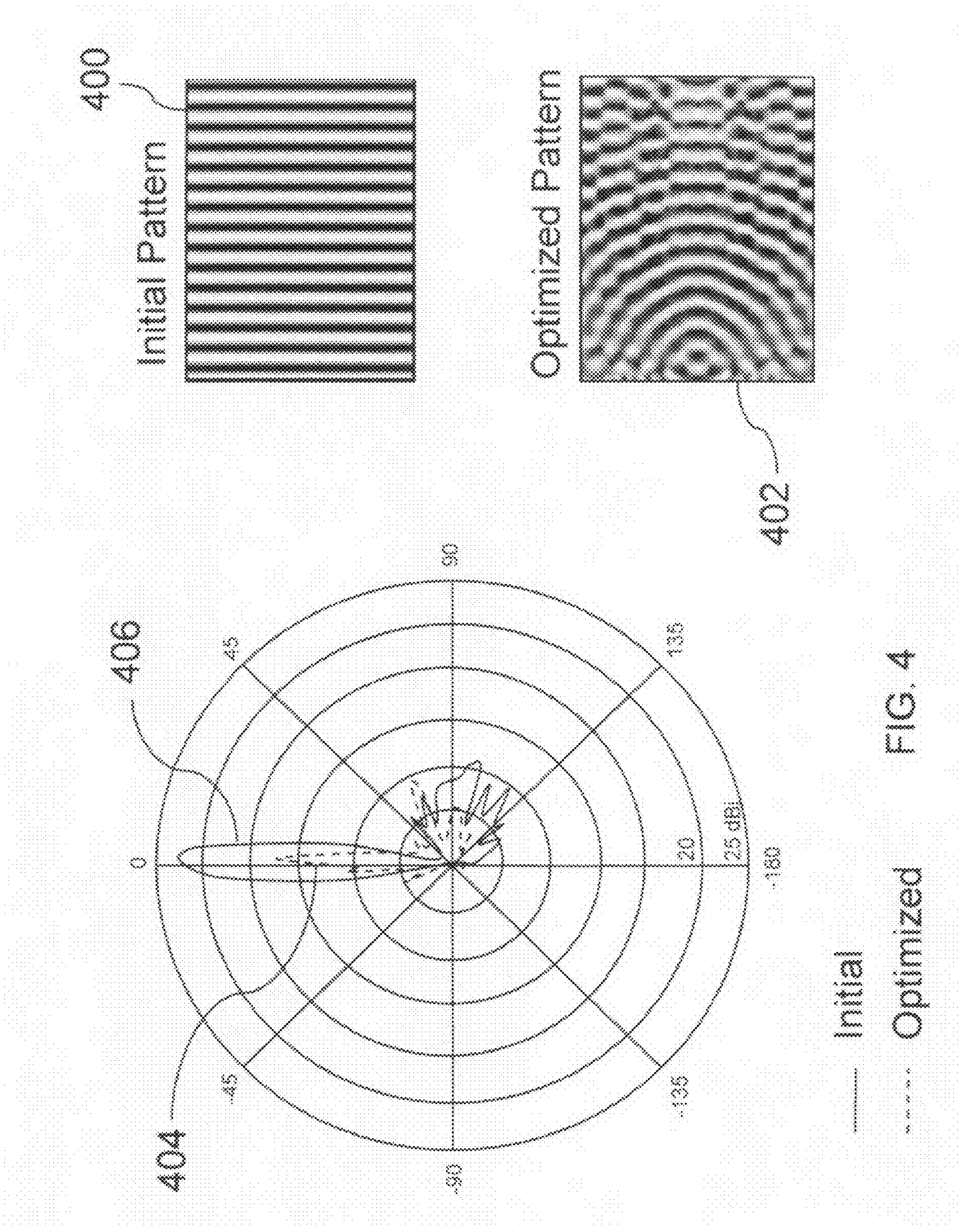
FIG. 4 is a set of illustrations and a polar plot showing initial and optimized impedance surfaces where the excitation is a parallel plate waveguide feed, and their respective far field radiation patterns.

FIG. 4 is a set of illustrations and a polar plot showing an initial impedance pattern 400 and optimized impedance pattern 402 where the excitation is a parallel plate waveguide feed, and their respective initial 404 and optimal 406 far field radiation patterns. The optimized surface shows a 10 dBi gain in directivity, and a more than five-fold increase in the power to the normally directed beam.

Figure 5:
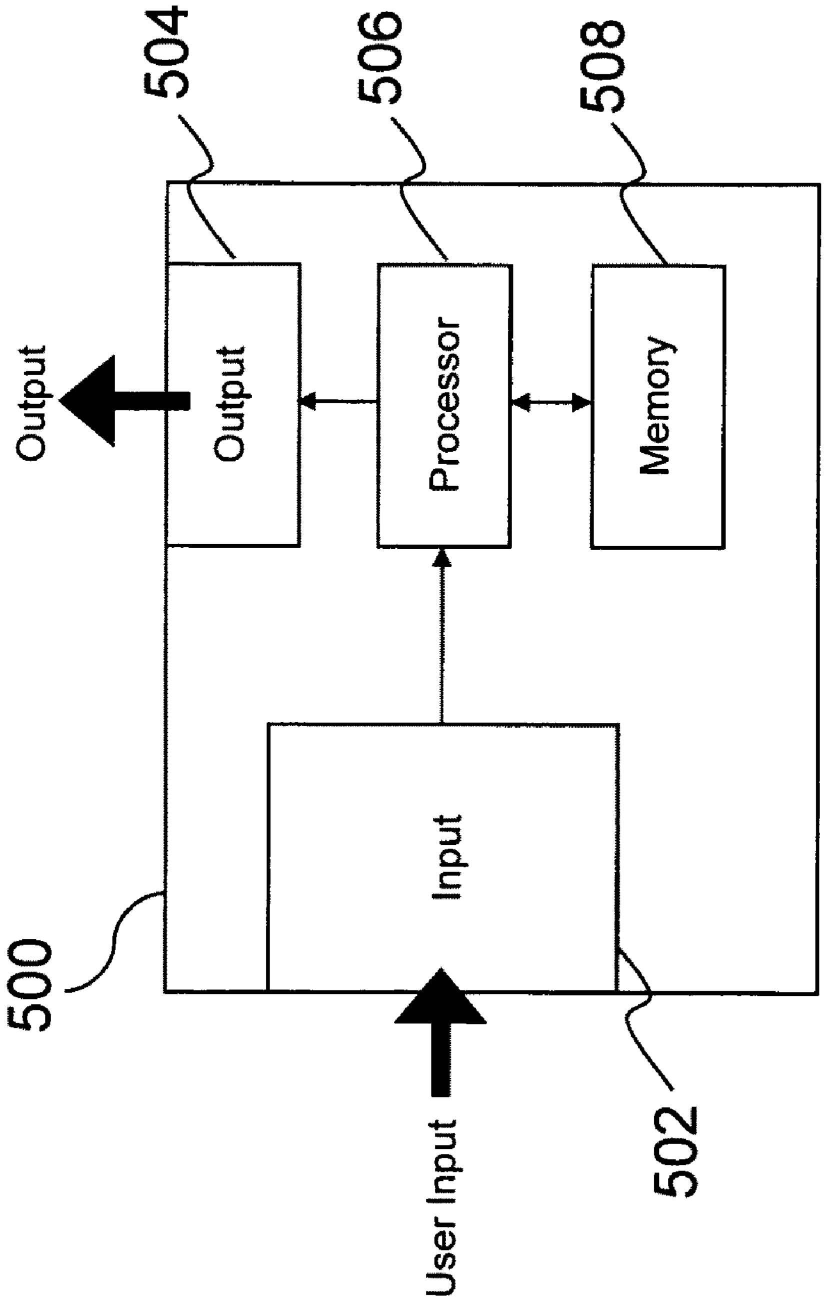
FIG. 5 is a block diagram of a general data processing system for use with the present invention.

A block diagram depicting the components of a data processing computer system used in the present invention is provided in FIG. 5. The data processing system 500 comprises an input 502 for receiving information from a user and/or from other components. The present invention requires the system to receive input parameters comprising an impedance range, a feed excitation surface wave, an impedance surface, and a desired far field radiation pattern. The information received may include input from devices such as scanners, keypads, keyboards, mice, other peripherals such as storage devices, other programs, etc. The input 502 may include multiple "ports." Connected to the processor 506 is an output 504 for providing information for transmission to other data processing systems, to storage devices, to display devices such as monitors, to generating information necessary for delivery, and to other mechanisms for presentation in user-readable forms. Output 504 may also be provided to other devices or other programs, e.g. to other software modules, for use therein. The input 502 and the output 504 are both coupled with a processor 506, the processor configured to execute the acts of the method of the present invention, such acts including: calculating a $0^{th}$ order surface wave profile for the impedance surface from the set of input parameters; calculating an artificial impedance pattern for the impedance surface from the $0^{th}$ order surface wave profile and the desired far field radiation pattern; calculating an actual surface wave profile produced on the impedance surface from the artificial impedance pattern, and an actual far field radiation pattern produced by the actual surface wave profile; calculating an optimized artificial impedance pattern by iteratively re-calculating the artificial impedance pattern from the actual surface wave profile and the desired far field radiation pattern; and determining an optimized artificial impedance surface by mapping the optimized artificial impedance pattern onto a representation of a physical surface. The processor 506 is coupled with a memory 508 to permit storage of data and software to be manipulated by commands to the processor.

Figure 6:
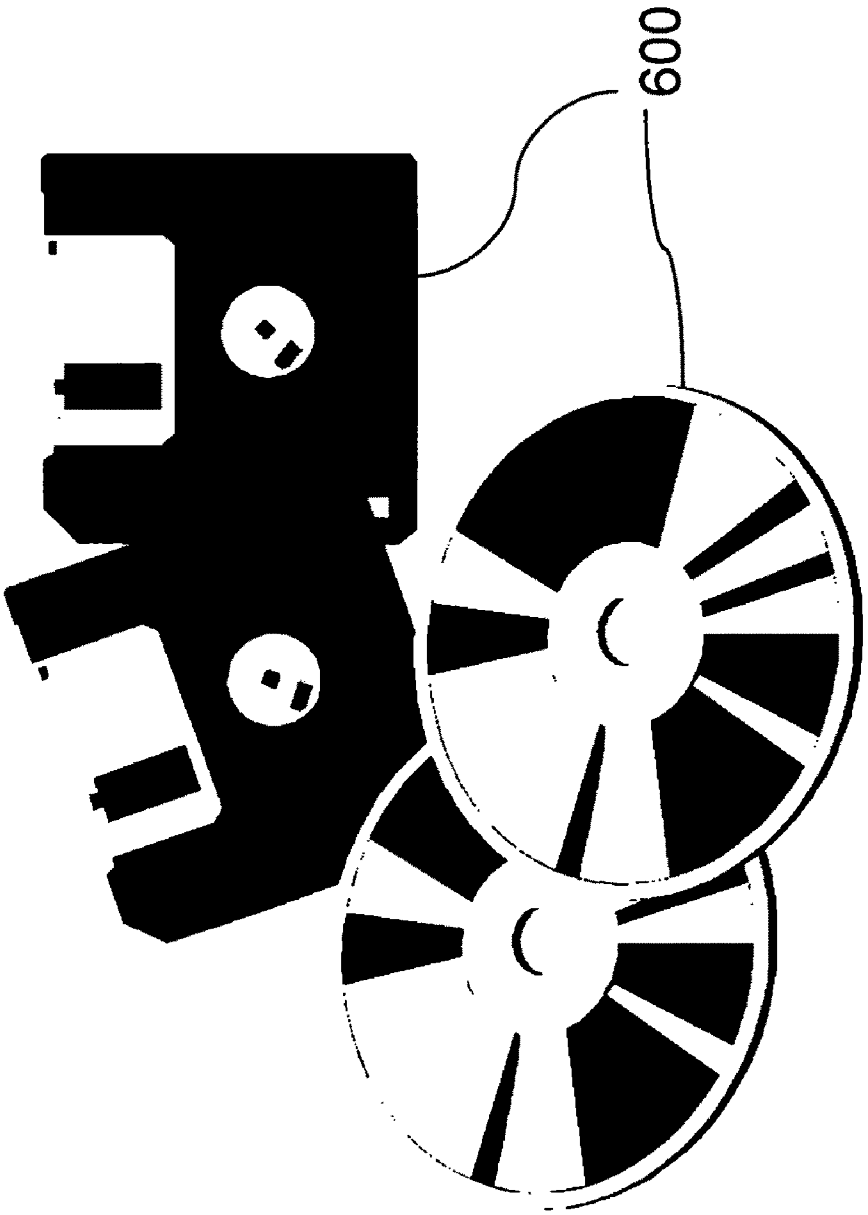
FIG. 6 is an illustrative diagram showing a computer program product according to the present invention.

An illustrative diagram of a computer program product embodying the present invention is depicted in FIG. 6. The computer program product 600 is depicted as an optical disk such as a CD or DVD. However, the computer program product generally represents computer readable code stored on any compatible computer readable medium. For use with the present invention, the computer readable code contains instructions for causing a data-processing system to: receive a set of input parameters, the set of input parameters comprising an impedance range, a feed excitation surface wave, and an impedance surface; calculate a $0^{th}$ order surface wave profile for the impedance surface from the set of input parameters; receive an input defining a desired far field radiation pattern; calculate an artificial impedance pattern for the impedance surface from the $0^{th}$ order surface wave profile and the desired far field radiation pattern; calculate an actual surface wave profile for the impedance surface from the artificial impedance pattern, and an actual far field radiation pattern produced by the actual surface wave profile; calculate an optimized artificial impedance pattern by iteratively re-calculating the artificial impedance pattern from the actual surface wave profile and the desired far field radiation pattern; and determine an optimized artificial impedance surface by mapping the optimized artificial impedance pattern onto a representation of a physical surface.

What is claimed is:

1. A method for determining an optimized artificial impedance surface comprising acts of:

- selecting a set of input parameters, the set of input parameters comprising an impedance range, a feed excitation surface wave, and an impedance surface;
- calculating a $0^{th}$ order surface wave profile for the impedance surface from the set of input parameters;
- determining a desired far field radiation pattern;
- calculating an artificial impedance pattern for the impedance surface from the $0^{th}$ order surface wave profile and the desired far field radiation pattern;
- calculating an actual surface wave profile produced on the impedance surface from the artificial impedance pattern, and an actual far field radiation pattern produced by the actual surface wave profile;
- calculating an optimized artificial impedance pattern by iteratively re-calculating the artificial impedance pattern from the actual surface wave profile and the desired far field radiation pattern; and
- determining an optimized artificial impedance surface by mapping the optimized artificial impedance pattern onto a representation of a physical surface.

2. The method of claim 1, where in the act of selecting a set of input parameters, the impedance range is selected from a set of physically realizable maximum and minimum impedances.

3. The method of claim 1, where in the act of calculating an optimized artificial impedance pattern, the optimized artificial impedance pattern is calculated through use of a Picard-like iteration scheme, the Picard-like iteration scheme taking the form:

$$Z^{(n+1)}(x)=-if(Re(E_{out}\cdot J_{surf}{}^{*(n)}/|J_{surf}{}^{(n)}|));$$

where:

- $Z^{(n+1)}(x)$ is the $(n+1)^{th}$ iteration of the impedance pattern as a function of position x on the surface;
- i is the imaginary number Sqrt[−1];
- f(s) is a function that rescales its argument so that $s_{min}$ and $s_{max}$ correspond to the minimum and maximum realizable impedances;
- Re(s) gives the Real part of s;
- $E_{out}(x)$ is the desired electric field vector of the outgoing radiation pattern evaluated at the position x on the surface;
- A·B is the dot product of vectors A and B;
- $J^{(n)}{}_{surf}(x)$ is the $n^{th}$ iteration of the surface wave vector evaluated at position x on the surface;
- J* represents the complex conjugate of the function J; and
- |A| is the norm of the vector A.

4. The method of claim 3, where in the act of calculating an optimized artificial impedance pattern, the iteration scheme is terminated by a criterion selected from a group consisting of:

- the end of a fixed time period;
- when the actual far field radiation pattern calculated is substantially improved from the actual far field radiation pattern calculated from the $0^{th}$ order surface wave profile; and
- when the actual far field radiation pattern substantially converges to the desired far field radiation pattern.

5. The method of claim 1, where in the act of calculating an optimized artificial impedance pattern, the optimized artificial impedance pattern is calculated through use of a Picard-like iteration scheme, the Picard-like iteration scheme taking the form:

$$Z^{(n+1)}(x)=-if(Re[\psi_{out}\psi_{surf}{}^{*(n)}/|\psi_{surf}{}^{(n)}|[)$$

where:

- $Z^{(n+1)}(x)$ is the $(n+1)^{th}$ iteration of the impedance pattern as a function of position x on the surface;
- i is the imaginary number Sqrt[−1];
- f(s) is a function that rescales its argument so that $s_{min}$ and $s_{max}$ correspond to the minimum and maximum realizable impedances;
- Re(s) gives the Real part of s;
- $\psi_{out}(x)$ is the desired field scalar of the outgoing radiation pattern evaluated at the position x on the surface;
- $\psi^{(n)}{}_{surf}(x)$ is the $n^{th}$ iteration of the surface wave scalar evaluated at position x on the surface;
- ψ* represents the complex conjugate of the function ψ; and
- |ψ| is the modulus of the scalar ψ.

6. The method of claim 5, where in the act of calculating an optimized artificial impedance pattern, the iteration scheme is terminated by a criterion selected from a group consisting of:

the end of a fixed time period;

when the actual far field radiation pattern calculated is substantially improved from the actual far field radiation pattern calculated from the $0^{th}$ order surface wave profile; and when the actual far field radiation pattern substantially converges to the desired far field radiation pattern.

7. The method of claim 1 further comprising an act of forming a physical impedance surface based on the optimized artificial impedance pattern mapped onto the representation of a physical surface.

8. An artificial impedance surface map generated by the method of claim 1.

9. A physical impedance surface formed by the method of claim 7.

10. A data processing system having a memory and a processor, the data processing system including computer-readable instructions for causing the data processing system to:

receive a set of input parameters, the set of input parameters comprising an impedance range, a feed excitation surface wave, and an impedance surface;

calculate a $0^{th}$ order surface wave profile for the impedance surface from the set of input parameters;

receive an input defining a desired far field radiation pattern;

calculate an artificial impedance pattern for the impedance surface from the $0^{th}$ order surface wave profile and the desired far field radiation pattern;

calculate an actual surface wave profile produced on the impedance surface from the artificial impedance pattern, and an actual far field radiation pattern produced by the actual surface wave profile;

calculate an optimized artificial impedance pattern by iteratively re-calculating the artificial impedance pattern from the actual surface wave profile and the desired far field radiation pattern; and determine an optimized artificial impedance surface by mapping the optimized artificial impedance pattern onto a representation of a physical surface.

11. A computer program product having computer readable instructions encoded thereon for causing a data processing system to:

receive a set of input parameters, the set of input parameters comprising an impedance range, a feed excitation surface wave, and an impedance surface;

calculate a $0^{th}$ order surface wave profile for the impedance surface from the set of input parameters;

receive an input defining a desired far field radiation pattern;

calculate an artificial impedance pattern for the impedance surface from the $0^{th}$ order surface wave profile and the desired far field radiation pattern;

calculate an actual surface wave profile for the impedance surface from the artificial impedance pattern, and an actual far field radiation pattern produced by the actual surface wave profile;

calculate an optimized artificial impedance pattern by iteratively re-calculating the artificial impedance pattern from the actual surface wave profile and the desired far field radiation pattern; and determine an optimized artificial impedance surface by mapping the optimized artificial impedance pattern onto a representation of a physical surface.

* * * * *